United States Patent
Nagy

(10) Patent No.: US 8,884,812 B2
(45) Date of Patent: Nov. 11, 2014

(54) METHOD AND APPARATUS FOR DETECTING VEHICLE WHEELS

(75) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 234 days.

(21) Appl. No.: 13/489,322

(22) Filed: Jun. 5, 2012

(65) Prior Publication Data

US 2012/0326914 A1 Dec. 27, 2012

(30) Foreign Application Priority Data

Jun. 21, 2011 (EP) .................................. 11450080

(51) Int. Cl.
| | |
|---|---|
| *G01S 13/00* | (2006.01) |
| *G08G 1/01* | (2006.01) |
| *G01S 13/58* | (2006.01) |
| *G01S 13/91* | (2006.01) |
| *G01S 7/41* | (2006.01) |

(52) U.S. Cl.
CPC .............. *G01S 7/415* (2013.01); *G08G 1/0116* (2013.01); *G01S 13/58* (2013.01); *G01S 13/91* (2013.01)
USPC ........................................... 342/70; 342/175

(58) Field of Classification Search
CPC ......... G08G 1/166; G08G 1/00; G08G 1/015; G08G 1/056; G08G 1/16; G08G 1/167; G08G 1/0116; G08G 1/052; G01S 13/91; G01S 13/50; G01S 7/41; G01S 7/415; G01S 13/06; G01S 13/52; G01S 13/58
USPC ............................................. 342/70–72, 175
See application file for complete search history.

(56) References Cited

U.S. PATENT DOCUMENTS

| | | | | | |
|---|---|---|---|---|---|
| 4,117,481 | A | * | 9/1978 | Constant | 342/44 |
| 4,348,674 | A | * | 9/1982 | Muth et al. | 342/192 |
| 5,087,918 | A | * | 2/1992 | May et al. | 342/85 |
| 5,321,490 | A | * | 6/1994 | Olson et al. | 356/5.03 |
| 5,537,110 | A | * | 7/1996 | Iida et al. | 340/942 |
| 5,546,188 | A | * | 8/1996 | Wangler et al. | 356/5.01 |
| 5,717,390 | A | * | 2/1998 | Hasselbring | 340/933 |
| 5,757,472 | A | * | 5/1998 | Wangler et al. | 356/4.01 |
| 5,771,485 | A | * | 6/1998 | Echigo | 701/119 |
| 5,809,161 | A | * | 9/1998 | Auty et al. | 382/104 |

(Continued)

FOREIGN PATENT DOCUMENTS

| | | | |
|---|---|---|---|
| DE | 10 2008 037 233 A1 | | 3/2010 |
| DE | 102008037233 | * | 3/2010 |

OTHER PUBLICATIONS

Extended European Search Report for corresponding European Patent Application No. 11 450 080.4, dated Oct. 17, 2011, 6pp.

*Primary Examiner* — Peter Bythrow
(74) *Attorney, Agent, or Firm* — Fiala & Weaver P.L.L.C.

(57) ABSTRACT

Method for detecting wheels of a vehicle that is traveling on a roadway in a travel direction and the wheels of which are at least partially exposed laterally. The method including: emitting an electromagnetic measurement beam lobe with a known temporal progression of frequency from the side of the roadway onto an area of the roadway and at a slant with respect to the travel direction, receiving the measurement beam lobe reflected by a passing vehicle and recording the temporal progression, relative to the known progression, of all of its frequencies, and during the passage of a vehicle, detecting a frequency spread appearing in the recorded progression and exceeding a predetermined spread magnitude, as a wheel.

4 Claims, 7 Drawing Sheets

(56) References Cited

U.S. PATENT DOCUMENTS

| | | | |
|---|---|---|---|
| 5,821,879 A * | 10/1998 | Liepmann | 340/942 |
| 5,896,190 A * | 4/1999 | Wangler et al. | 356/4.01 |
| 5,912,822 A * | 6/1999 | Davis et al. | 702/143 |
| 6,195,019 B1 * | 2/2001 | Nagura | 340/928 |
| 6,304,321 B1 * | 10/2001 | Wangler et al. | 356/4.01 |
| 6,404,506 B1 * | 6/2002 | Cheng et al. | 356/634 |
| 2002/0140924 A1 * | 10/2002 | Wangler et al. | 356/28 |
| 2003/0189500 A1 * | 10/2003 | Lim | 340/937 |
| 2008/0278365 A1 * | 11/2008 | Klein et al. | 342/104 |
| 2010/0286898 A1 * | 11/2010 | Lin | 701/119 |

* cited by examiner

METHOD AND APPARATUS FOR DETECTING VEHICLE WHEELS

CROSS-REFERENCE TO RELATED APPLICATION(S)

This application claims priority to European Patent Application No. 11 450 080.4, filed on Jun. 21, 2011, the contents of which are hereby expressly incorporated by reference.

FIELD OF THE INVENTION

The present invention relates to a method and an apparatus for detecting wheels of a vehicle that is traveling on a roadway in a travel direction and the wheels of which are at least partially exposed laterally.

BACKGROUND

Detecting vehicle wheels is of interest for numerous applications. Thus it is possible to infer with certainty from the recognition of wheels that a given traffic area is being driven on in order, for example, to monitor borders or to initiate certain actions such as triggering an alarm, switching on lighting, opening a barrier, taking a picture for monitoring purposes, etc. Modern traffic fee systems also frequently base the calculation of fees on the number of axles of vehicles, so that the detection of wheels (wheel axles) can also be an important basis for road toll or parking fee systems.

Detecting wheels of a moving vehicle based on the horizontal component of their tangential velocity, which differs from that of the rest of the vehicle and brings about a corresponding Doppler frequency shift of a radar measuring beam, is known, for example, from DE 10 2008 037 233 A1. For this purpose, a radar speed measuring unit is used that irradiates the lower area of passing vehicles with a radar beam lobe and, from the returning frequency mixture, determines a single speed measurement signal that has signal maxima at the locations of the wheels. Automatic detection of such maxima in a signal curve requires a signal-analytical search for extreme values and is correspondingly elaborate. In addition, gaps between a traction vehicle and its trailer can falsely indicate signal maxima and intermediate "false" maxima, which lead to an erroneous wheel detection.

SUMMARY

The present invention's methods and apparatuses for wheel detection achieve a more secure detection than that of known solutions.

In some embodiments, the present invention is a method for detecting a wheel of a vehicle that is traveling on a roadway in a travel direction, the wheels of which are at least partially exposed laterally. The method includes: emitting an electromagnetic measurement beam lobe with a known temporal progression (progression over time) of frequency, from the side of the roadway onto an area above the roadway and at a slant with respect to the travel direction: receiving the measurement beam lobe reflected by a passing vehicle and recording the temporal progression, relative to the known progression, of all of its frequencies appearing at the same time as a reception frequency mixture: and during the passage of the vehicle, detecting a frequency spread appearing in the recorded progression of the reception frequency mixture and exceeding a predetermined threshold value, as a wheel.

The predetermined threshold value may be determined in advance from a frequency spreading that appears during the passage of a wheel-less part of a vehicle. Thereby the method can be calibrated on-site by means of reference measurements.

In some embodiments, the present invention is an apparatus for detecting wheels of a vehicle that is traveling on a roadway in a travel direction and the wheels of which are at least partially exposed laterally. The apparatus including: at least one Doppler lidar or radar device configured to emit an electromagnetic measurement beam lobe with a known temporal progression of frequency onto a target and records the temporal progression, relative to the known progression, of all frequencies occurring at the same time from the target-reflected measurement beam lobe as a reception frequency mixture. The measurement beam lobe is oriented from the side of the roadway onto an area above the roadway and at a slant with respect to the travel direction. Further, a downstream evaluation unit is configured to detect a frequency spread appearing in the recorded temporal progression of the reception frequency mixture during the passage of the vehicle and exceeding a predetermined threshold value, as a wheel.

BRIEF DESCRIPTION OF THE DRAWINGS

Further characteristics and advantages of the method and the apparatus follow from the description below of a preferred exemplary embodiment with reference to the accompanying drawings, in which.

DETAILED DESCRIPTION

The present invention detects wheels of a moving vehicle based on the horizontal component of their tangential velocity, which differs from that of the rest of the vehicle, and brings about a corresponding Doppler frequency shift of a lidar or radar measuring beam. If a measurement beam is used that is expanded over a larger beam cross-section ("measurement beam lobe"), which is spread out or distributed in a conical shape over a solid angle, the beam strikes at least a part of the passing wheel over an extended area of incidence, e.g., an ellipse with a height or width in the range of 10 cm to 50 cm. At every different height of a rotating wheel, the wheel has a different horizontal component of its tangential velocity—constant across its width—and thus generates a different Doppler frequency shift, which leads to a "fragmentation" or "spreading" of the transmission frequency of the measuring beam lobe into a plurality of reception frequencies returned by the rotating wheel. When a rotating wheel is struck by a measurement beam lobe over an extended height area, it produces a frequency spread in the reception spectrum across its height, which can be used for detecting the wheel.

This effect is superimposed by a second parasitic frequency spreading effect, which can be traced back to the different projection angle of the horizontal component of the tangential velocity relative to the direction from the receiver: this projection direction varies as a function of the observed reflection point in the area of incidence. This second spreading effect is independent of whether the vehicle body or the rotating wheel passes by the receiver, and is determined solely by the overall geometric conditions of the measurement arrangement. The amount of spreading from the first-mentioned frequency fragmentation induced by the Doppler effect that must be exceeded for detection of a wheel is therefore defined in such a manner that it is greater than the frequency spread produced by the second-mentioned geometrically induced frequency fragmentation. As a result, a wheel detection method with a high detection certainty is achieved based on the "Doppler signature" produced by a wheel.

The invention—if it operates with a Doppler radar device—is particularly suitable in connection with the radio beacon of an already existing wireless roadway infrastructure such as a WLAN (wireless local area network), WAVE (wireless access in a vehicle environment), or DSRC (dedicated short range communication). An especially advantageous embodiment of the invention is characterized in that the Doppler radar device is constituted by a roadside WLAN, WAVE, or DSRC radio beacon.

Figure 1:
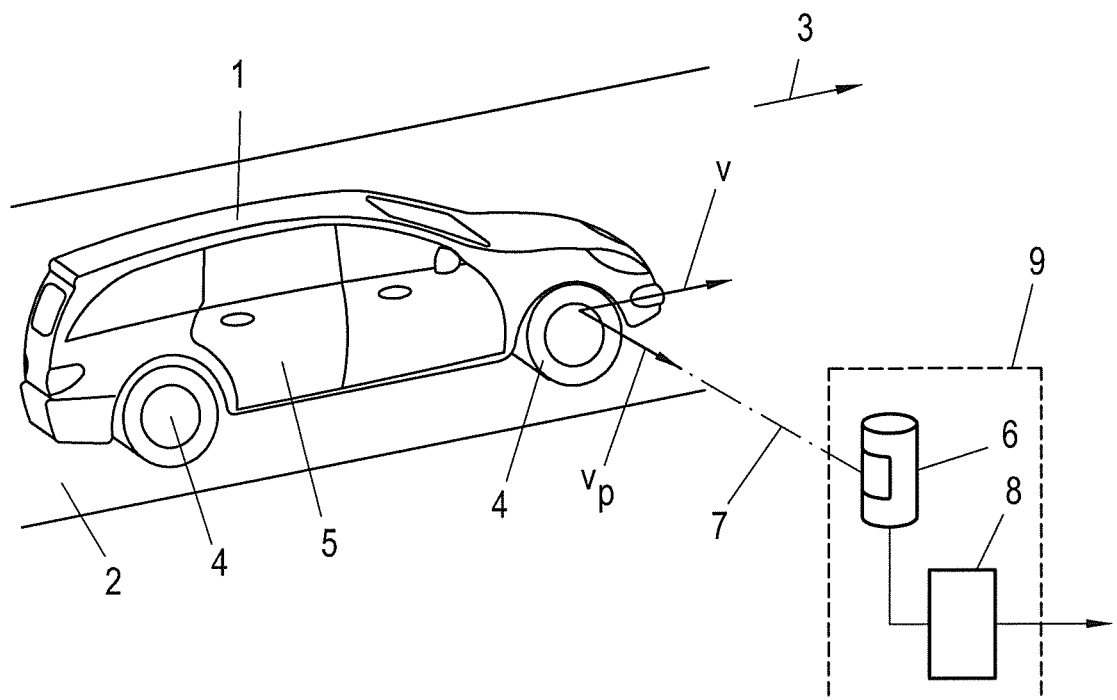
FIG. 1 shows an apparatus for wheel detection in a schematic perspective view, according to some embodiments of the present invention.

FIG. 1 shows an apparatus for wheel detection in a schematic perspective view, according to some embodiments of the present invention. As shown, a vehicle 1 is moving on a roadway 2 in a travel direction 3. The vehicle 1 has wheels 4 that project downward from the body 5 of the vehicle 2 and that at the same time are, at least partially, exposed on the sides of the body in openings thereof, i.e., are visible from the side.

A Doppler lidar or radar device 6 emits a concentrated lidar or radar measurement beam 7 from the side of the roadway 1 at a slant to the travel direction 3 and slightly above the surface of the roadway, so that the measurement beam 7 strikes a passing vehicle 1 roughly in the area of its wheels 4.

In a manner known in the art, the Doppler lidar/radar device 6 evaluates the reception frequency of the measurement beam 7 reflected by the vehicle 1 or its wheels 4. Accordingly, the (projected) component $v_p$ of the vehicle velocity v of the vehicle 1 in the direction of the measurement beam 7, or the tangential velocity $v_t$ (FIG. 2) of the wheels 4 at the point of incidence of the measurement beam 7, can be determined from the Doppler effect-induced frequency shift between emitted and reflected measurement beam 7. The wheels 4 of the vehicle 1 is then detected from this information, as will be described in greater detail below. An evaluation unit 8 that undertakes the corresponding evaluations of the reception frequency of measurement beam 7 is arranged downstream of the device 6. The lidar/radar device 6 and the evaluation unit 8 thus together form an apparatus 9 for detecting wheels 4 of the vehicle 1.

The Doppler lidar/radar device 6 itself can be of any type known in the art, whether with a continuous, modulated, or pulsed measurement beam 7. For a continuous measurement beam 7, a Doppler frequency shift between the natural frequencies ("carrier frequencies") of the emitted and reflected measurement beam 7 can be determined by interference measurement. For a pulsed or modulated measurement beam, a Doppler shift between the pulse rates or modulation frequencies of the emitted and the reflected measurement beam 7 can be measured. The term "reception frequency" used here is understood to mean all such natural, carrier, pulse, or modulation frequencies of the measurement beam 7, i.e., the term reception frequency comprises any type of frequency of the measurement beam 7 influenced by a Doppler effect.

In principle, the nature of the measurement beam 7 itself is also arbitrary, so long as it is an electromagnetic wave, whether it be visible light or infrared light as in a lidar device, or radio waves, especially microwaves, as in a radar device.

The measurement beam 7 in the explanatory example of FIG. 1 is strongly concentrated so that its point of incidence on the body 5 or the wheel 4 has an extremely small diameter.

Figure 2:
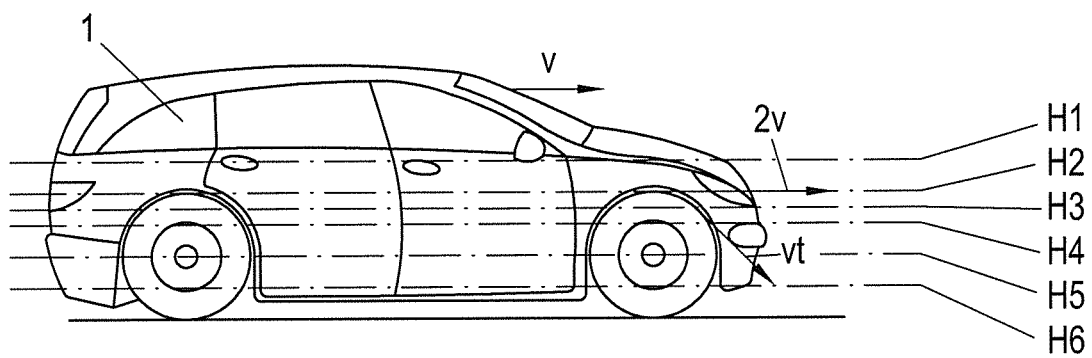
FIG. 2 shows several exemplary scanning progressions of the measurement beam in an apparatus according to FIG. 1 on a passing vehicle.

FIG. 2 shows the scanning progressions of such a concentrated measurement beam 7, which strikes the vehicle 1 or its wheels 4 substantially in point form during the passage of the vehicle 1 passing the apparatus 9. For explanatory purposes, six different scanning progressions H1 through H6 are shown for the sake of example. However, it is understood that only a single scanning progression H1-H6 from a concentrated measurement beam 7 occurs during the passage of a vehicle.

Figure 3:
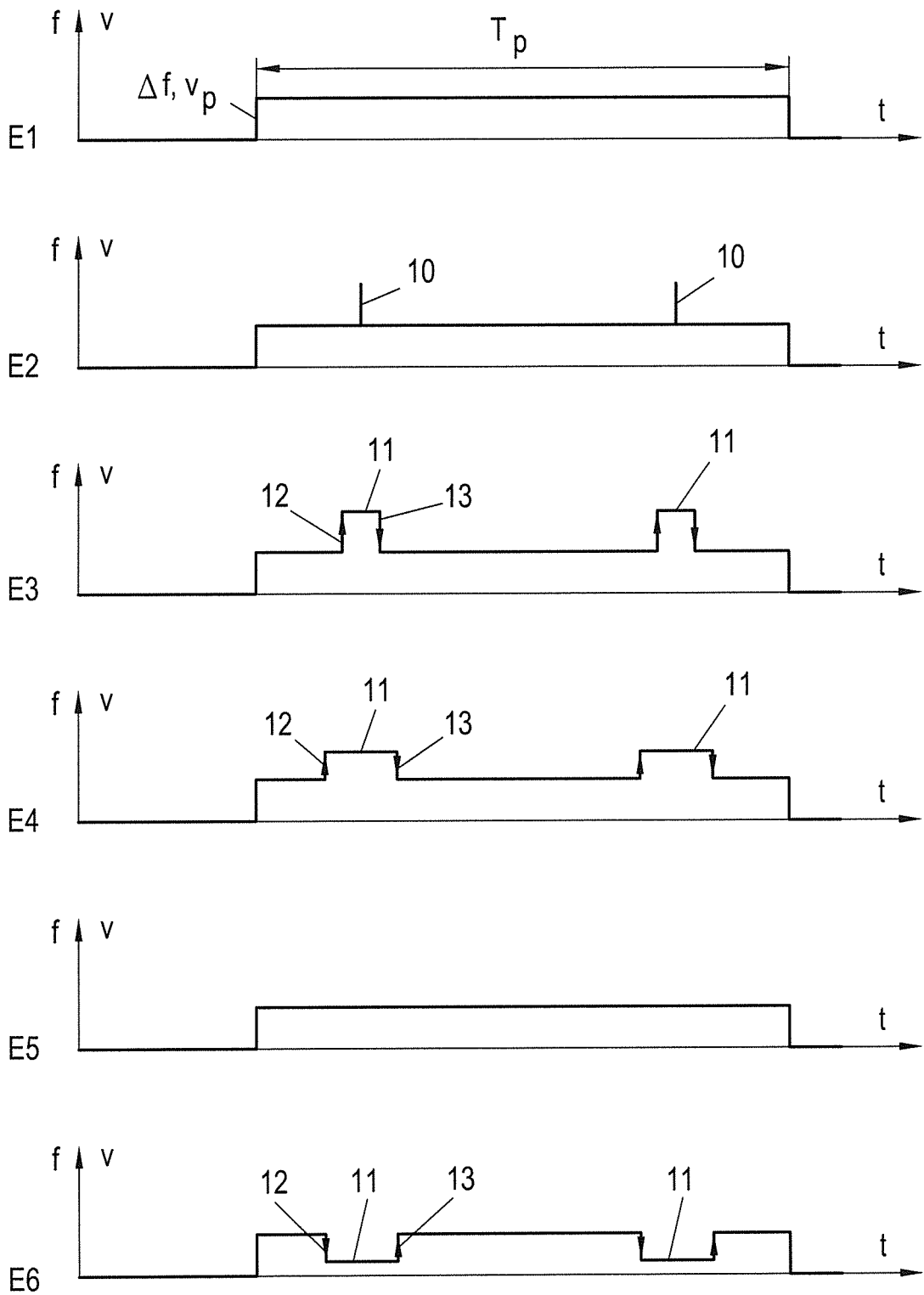
FIG. 3 shows timing diagrams of the determined progressions of reception frequency or speed for the scanning progressions of FIG. 2.

FIG. 3 shows the reception frequency f of the reflected measurement beam 7 over time for the scanning progressions H1-H6 continuously received by the lidar/radar device 6. The Doppler shift Δf of the reception frequency f relative to the transmission frequency is proportional to the velocity component $v_p$ of the respectively scanned parts of the vehicle 1, or the wheel 4. The reception frequency progressions E1-E6 illustrated in FIG. 3 are therefore equivalent to the velocity progressions.

As can be seen from the reception frequency progression E1 of FIG. 3, the scanning progression H1, which strikes the body 5 of the vehicle 1 outside the wheels 4, has a substantially constant reception frequency shift Δf of the measurement beam 7. Thus, the velocity component $v_p$ during the duration $T_p$ of the body passage is expressed as a square wave pulse R in the reception frequency progression.

For the scanning progression H2, which strikes the wheels 4 at their uppermost point, where their tangential velocity $v_t$ is added to the vehicle velocity v, the reception frequency progression E2 has a peak 10 of $2v_p$ above the body square wave pulse R for each wheel 4.

If the measurement beam 7 strikes the wheels 4 at a level between the wheel axle and the upper side of the wheel, as in the scanning progressions at H3 and H4, an abruptly varying Doppler shift in the measurement direction relative to the body pulse R, and thus a shift in the reception frequency or speed, is measured during the passage of a wheel 4, corresponding to the projection $v_p$ of its tangential velocity $v_t$, as illustrated by the square wave pulses 11 of the progressions E3 and E4. Each pulse 11 comprises a rising edge 12 and a subsequent falling edge 13, i.e., two successive alternating frequency discontinuities.

The reception frequency progression E5 shows the special case where the measurement beam 7 strikes the wheels 4 precisely at the level of their axles, where no tangential velocity of the wheel that could be projected in the direction of the measurement beam 7 exists, so that the wheels 4 are not detectable.

The reception frequency progression E6 scans the wheels 4 at a level between their underside and their axle, and resembles that of E4, but with reversed changes of items 11-13.

Figure 4:
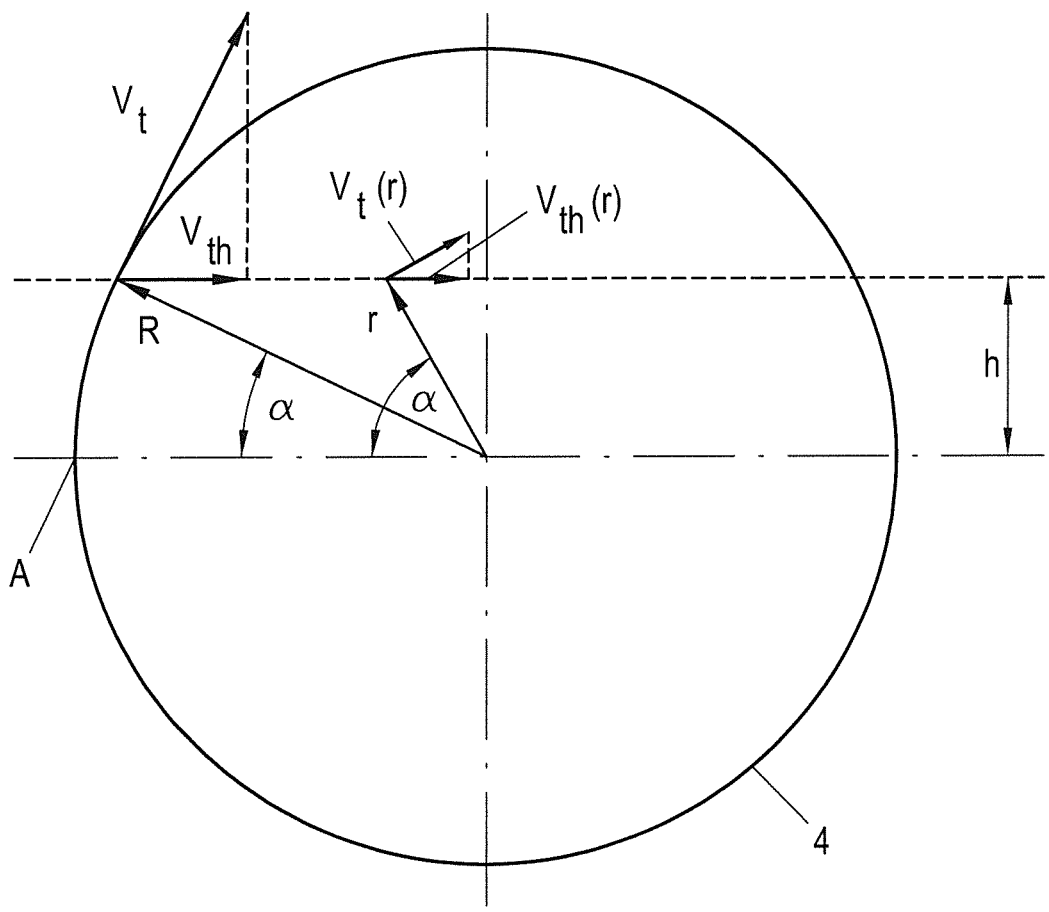
FIG. 4 shows the speed relationships on a rotating wheel in detail, according to some embodiments of the present invention.

FIG. 4 analytically shows the extent of the offset 11 of a wheel 4 as a function of the height h of the respective scanning progression H1-H6 relative to the wheel axle A, using the scanning progression H4 as an example. If R is the radius of the wheel 4 and r an arbitrary radius inside of wheel 4, then the tangential velocity $v_t(r)$ at a radius r is proportional to this radius r:

$$v_t(r) = \frac{r}{R}v_t. \tag{1}$$

The horizontal component $v_{th}(r)$ of the tangential velocity $v_t(r)$ in the travel direction 3 at an angle α is a sine projection corresponding to $$v_{th}(r) = \frac{r}{R}v_t \sin\alpha \tag{2}$$

With $$\sin\alpha = \frac{h}{r}. \tag{3}$$

the horizontal component $v_{th}(r)$ of the tangential velocity thus results as $$v_{th}(r) = v_t \frac{h}{R} \tag{4}$$

The horizontal component $v_{th}(r)$ of the tangential velocity is thus directly proportional to the respectively considered height h of the scanning progression and is constant over this height h while the wheel 4 is being scanned.

Figure 5:
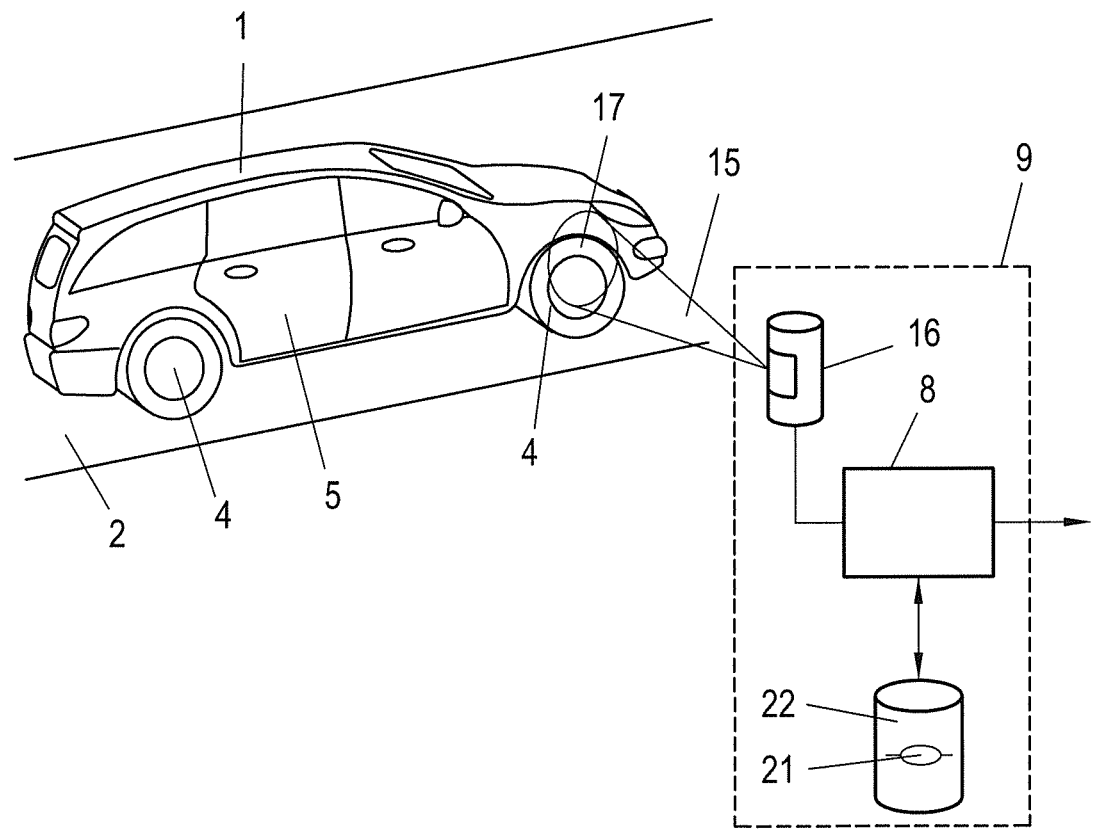
FIG. 5 shows an apparatus for wheel detection in a schematic perspective view, according to some embodiments of the present invention.

FIG. 5 shows an extension of the method of FIGS. 1-4 in which, instead of a concentrated measurement beam 7, a widened measurement beam, scattered or expanded two-dimensionally or in a funnel-shape for example, is used. This is referred to as "measurement beam lobe" 15 for the sake of brevity. The measurement beam lobe 15 can be achieved in a lidar device by an output-side concave lens, or can occur with radar devices that lack precise focusing. As an example, FIG. 5 shows a Doppler radar device 16, which together with the evaluation unit 8 form an apparatus 9.

In the case of radar, the measurement beam lobe 15 is fowled by the acceptance angle of the radar antenna being used. The acceptance angle (or the half-value width) of a directional antenna refers to the points where the power has declined to half (−3 dB) relative to the maximum. As known to those skilled in the art, the gain of the antenna in its main radiation direction can be calculated with the following formula from knowledge of the respective acceptance angle:

$$g = 10 lg \frac{27.000}{\Delta\varphi\Delta\vartheta} \tag{5}$$

where
g=gain [dBi]
Δφ=horizontal acceptance angle (in degrees)
Δδ=vertical acceptance angle (in degrees)

Figure 7:
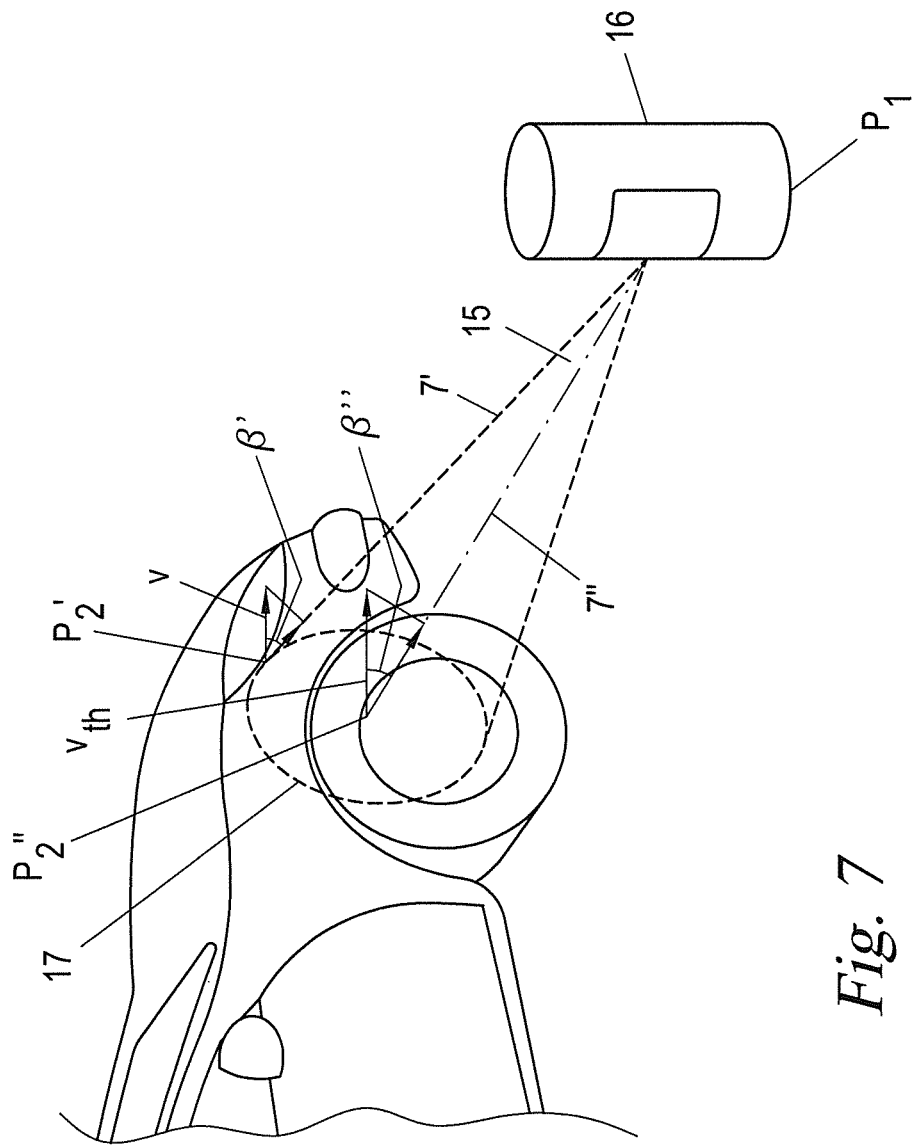
FIG. 7 shows the geometric relationships in the measurement beam lobe of the apparatus of FIG. 5 to illustrate the geometry-induced frequency spreading during the passage of a vehicle.

The acceptance angle of the radar antenna allows for a good separation of the individual wheels 4 in the measurement signal of the vehicle 1 to be detected. Thus, it is favorable if the incidence area 17 of the measurement beam lobe 15 is substantially the size of wheel 4 of the vehicle 1, and does not cover only the wheel 4, but also lies somewhat above it, as shown in FIG. 7. The optimal incidence area 17 results from the measuring distance from the vehicle 1, and therefore the selection of the radar antenna depends on the geometry of the overall arrangement. In general, antennas with a gain g of more than 10 dB are especially suitable, depending on the arrangement and frequency of the radar device 16.

Directional antennas usually have an antenna gain g of more than 20 dB (which corresponds to an acceptance angle Δφ=Δδ=approx. 16°. Thus, an area 17 that is 56 cm in diameter can be illuminated 2 meters away from the vehicle 1 with an antenna gain of 20 dB. An antenna gain g of 30 dB can be necessary for more distant vehicles 1 in order to achieve an acceptance angle Δφ=Δδ=approx. 5°, which implies an illumination area 17 approx. 90 cm in size at a distance of 10 m.

When using such a measurement beam lobe 15, which strikes a relatively large area 17 of the vehicle 1 or the wheels 4, the respective reception frequencies E1-E6 from the various points of incidence in area 17. The exemplary scanning progressions H1-H6 in FIG. 2 are superimposed onto a mixture 18 of various reception frequencies or velocities (See, for example, FIG. 6.) In other words, when the reception frequency f strikes a wheel 4, it fragments or spreads into a Doppler effect-induced mixture 18 of reception frequencies or velocities during the passage $T_p$ of a vehicle 1, the extent of the spreading ("frequency spread'") being labeled $A_1$ in FIG. 6. The occurrence of such a frequency spread 18 can thus be used as a characteristic for a wheel 4.

Figure 8:
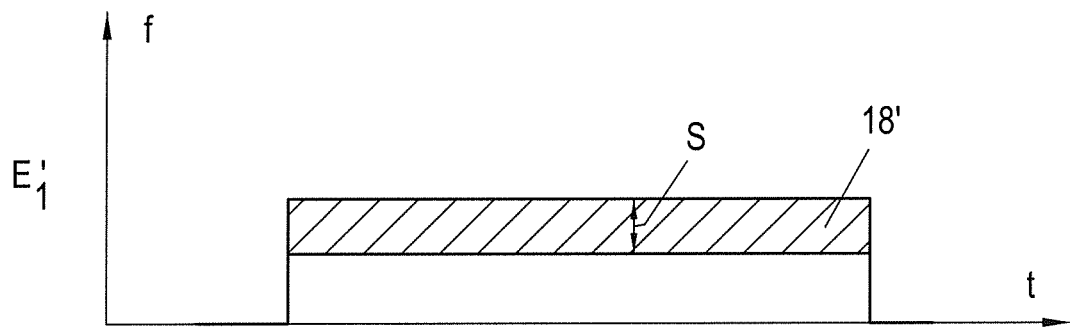
FIG. 8 shows the effect of the progression over time of the geometry-induced frequency spreading during the passage.

The Doppler effect-induced frequency spread 18 with an extent of $A_1$ is parasitically superimposed by a second frequency spread effect that is induced by the geometry of the measurement beam lobe 15 itself. From its location $P_1$, a radar/lidar device 16 observes, as shown in FIG. 7, various points $P_2'$, $P_2''$ in the area of incidence 17 of the measuring beam lobe 15 from a different spatial direction 7', 7" in each case, which together with the horizontal component $v_{th}$ of the tangential velocity $v_t$ of the wheel 4 or the velocity v of the vehicle body 5, encloses a respectively different solid angle $\beta_1$, $\beta_2$. The projection of the velocity v or $v_{th}$ onto the respective measurement beam direction 7', 7" in the measurement beam lobe 15 thereby leads across the area 17 to a geometry-induced fragmentation or spreading ("frequency spread") 18' of the reception frequencies for the velocity v of the vehicle body 5 at the level $H_1$ as a geometry-induced spread of the reception frequency progression $E_1'$, and assumes the dimension S, as shown in FIG. 8.

Figure 9:
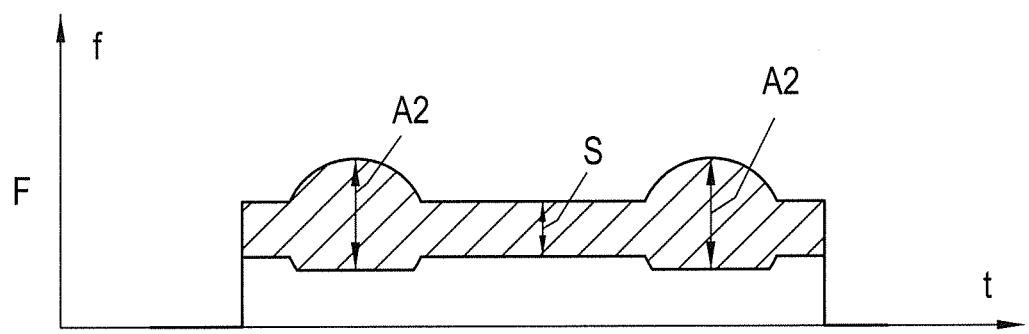
FIG. 9 shows the combined effect of the geometry-induced frequency spreading of FIG. 8 and the Doppler-induced frequency spreading of FIG. 6 in their progression over time during the passage of a vehicle.

The Doppler effect-induced spread 18 in the extent $A_1$ (FIG. 6) is superimposed by the geometry-induced spread 18' in the extent S (FIG. 8) into an "actual" reception frequency mixture F in the progression over time, as illustrated in FIG. 9. A frequency spread to the extent $A_2$, which is composed of the Doppler-induced spread $A_1$ and the geometry-induced spread S, is measured at the locations of the wheels 4.

The geometry-induced frequency spread 18' is substantially dependent only on the installation location and orientation of the radar/lidar device 16 relative to the roadway 2 or the driving position of the vehicle 1, and can therefore be determined by reference measurements with vehicles 1 (with covered wheels or if the measurement beam lobe 18 strikes only the body 5). The extent S of the geometry-induced frequency spread 18' can then be utilized as a reference or predetermined value for the actual radar detection process, which evaluates the reception frequency progression of FIG. 9 and detects a wheel 4, if the recorded progression F of reception frequencies shows a spread $A_2$ that exceeds the spread amount S specified as the reference.

In some embodiments, the spread extent S can be determined again each time for the current detection process during the passage of a vehicle 1, by storing the frequency spread 18' appearing in the first milliseconds of a vehicle passage when the vehicle body 5 enters into the measurement beam lobe 18, and using it as a threshold value for the subsequent wheel detection.

Figure 6:
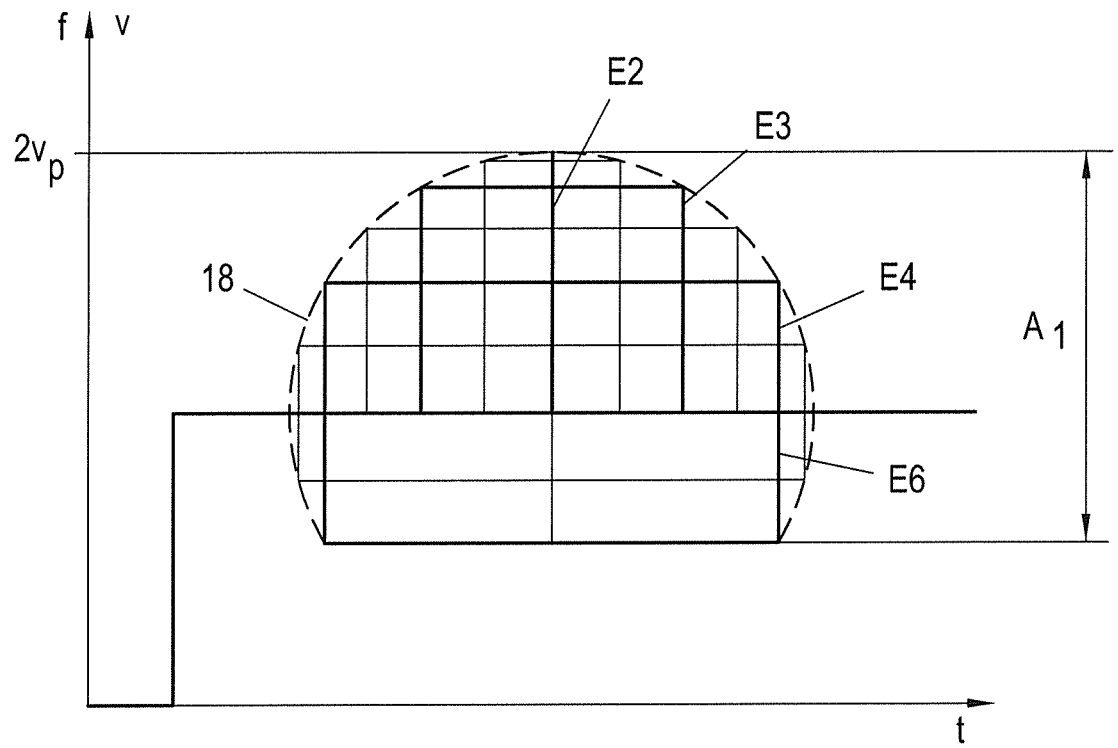
FIG. 6 shows the superposition of several progressions of reception frequency or speed from FIG. 3 to illustrate the Doppler-induced frequency spreading during the passage of a wheel.

As can be seen from FIG. 4 and equation (4), the enveloping curve of the Doppler-induced frequency spread 18 corresponds roughly to the circumferential contour of the wheel 4, viewed at the angles β', β", i.e., it is generally an ellipse, which may be truncated if the area 17 does not cover the entire wheel 4 (FIG. 6.) If the geometry-induced frequency spread 18' is additionally taken into consideration, the enveloping curve becomes more "unsharp" to the extent of the spread S, but its rough shape can still be analyzed, e.g., by storing the reception frequency mixture F of the reference passage for a reference wheel as "reference signature" 21, e.g., in a memory 22 of the apparatus 9 in order to subsequently compare it to the reception frequency progression F of an actual vehicle passage.

Figure 10:
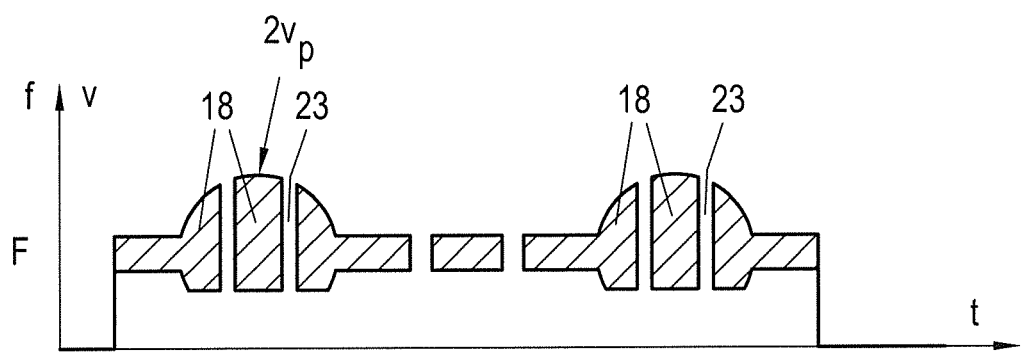
FIG. 10 shows a variant of FIG. 9, according to some embodiments of the present invention.

FIG. 10 shows a real case in which interruptions 23 appear in the reflected measurement beam lobe 15 and thus in the reception frequency progression signal F during the passage $T_p$ of a vehicle 1. In the comparison of the reference signatures 21 to such an actual reception frequency progression F, suitable comparisons of contour, surface area, and/or shape ("best fit matches") can be undertaken in order to achieve a high recognition certainty in such cases.

In the embodiments of FIG. 5, the Doppler radar device 16 of the apparatus 9 is constructed using existing wireless infrastructure of a roadway, e.g., using WAVE or DSRC radio beacons of a road toll system or WLAN radio beacons of a roadside Internet infrastructure. Thereby already existing transmitter components of the WLAN, WAVE, or DSRC radio beacons can be used as transmission components of the Doppler radar device 16; receiver sections of the radio beacons can likewise be used as the receiver components of the Doppler radar device 16, or can at least be integrated into the receiver components of the radio beacons. The apparatus and the method of the invention can be implemented in this manner as a software application running on one or more processors and accessible by a conventional WLAN, WAVE, or DSRC radio beacon, for example.

It has been assumed that the transmission frequency of the radar/lidar device 6 or the measurement beam lobe 15 is constant, i.e., its progression over time (temporal progression) is a constant progression. However, it is also possible that the device 6 could emit a measurement beam lobe 15 with a temporally non-constant transmission frequency, e.g., as in frequency hopping methods in which the frequency changes constantly according to a predetermined or known pattern. The recorded reception frequency progressions F are recorded relative to the previously known temporal progression of the transmission frequency for the measurement beam lobe 15—whether constant or varying, i.e., referenced or standardized thereto, so that the effect of known transmission frequency progressions can be compensated.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for detecting a wheel of a vehicle that is traveling on a roadway in a travel direction, the wheels of which are at least partially exposed laterally, the method comprising:
    emitting, from a Doppler lidar or radar device, an electromagnetic measurement beam lobe having a known temporal progression of frequency, from the side of the roadway onto an area above the roadway and at a slant with respect to the travel direction;
    receiving the measurement beam lobe reflected by a passing vehicle and recording the temporal progression, relative to the known progression, of all of its frequencies appearing at the same time as a reception frequency mixture in the device; and
    during the passage of the vehicle, detecting, in an evaluation unit, a frequency spread appearing in the recorded temporal progression of the reception frequency mixture and exceeding a predetermined threshold value, as a wheel.

2. The method according to claim 1, wherein the predetermined threshold value is determined in a previous step from a frequency spread that occurs during the passage of a wheel-less part of the vehicle.

3. An apparatus for detecting a wheel of a vehicle that is traveling on a roadway in a travel direction, the wheels of which are at least partially exposed laterally, comprising:
    at least one Doppler lidar or radar device that is configured to emit an electromagnetic measurement beam lobe with a known temporal progression of frequency onto a target and record the temporal progression, relative to the known progression, of all frequencies occurring at the same time from the measurement beam lobe reflected by the target, as a reception frequency mixture,
    wherein the measurement beam lobe is oriented from a side of the roadway onto an area above the roadway and at a slant with respect to the travel direction, and
    a downstream evaluation unit configured to detect a frequency spread appearing in the recorded temporal progression of the reception frequency mixture during the passage of the vehicle and exceeding a predetermined threshold value, as a wheel.

4. The apparatus according to claim 3 comprising a Doppler radar device, wherein the Doppler radar device is constituted by a roadside WLAN, WAVE, or DSRC radio beacon.

* * * * *